United States Patent [19]

Choi

[11] Patent Number: 5,532,995
[45] Date of Patent: Jul. 2, 1996

[54] DISC-CARTRIDGE FRONT LOADING APPARATUS OF A MINI DISC PLAYER

[75] Inventor: Young S. Choi, Seoul, Rep. of Korea

[73] Assignee: Daewoo Electronics Co., Ltd., Seoul, Rep. of Korea

[21] Appl. No.: 173,108

[22] Filed: Dec. 27, 1993

[30] Foreign Application Priority Data

Dec. 31, 1992 [KR] Rep. of Korea ................. 92-27169

[51] Int. Cl.$^6$ .................. G11B 33/02; G11B 17/028
[52] U.S. Cl. .................. 369/77.2; 360/99.03; 360/99.07
[58] Field of Search .................. 369/77.2, 75.1, 369/75.2, 77.1; 360/99.02, 99.06, 99.07

[56] References Cited

U.S. PATENT DOCUMENTS

| | | | |
|---|---|---|---|
| 4,098,511 | 7/1978 | Leedom | 274/9 B |
| 4,124,866 | 11/1978 | Coleman | 358/128 |
| 4,498,161 | 2/1985 | Eisemann | 369/75.2 |
| 4,802,041 | 1/1989 | Uehara | 360/99.06 |
| 4,953,042 | 8/1990 | Yoshikawa | 360/99.02 |
| 5,088,085 | 2/1992 | Uehara | 360/99.06 |
| 5,301,179 | 4/1994 | Okamoto | 369/77.1 |

FOREIGN PATENT DOCUMENTS 62-281156  12/1987  Japan ................. 369/77.2

*Primary Examiner*—Stuart S. Levy
*Assistant Examiner*—Kevin M. Watkins
*Attorney, Agent, or Firm*—Nixon & Vanderhye

[57] ABSTRACT

A disc-cartridge loading apparatus of a mini-disc player which comprises a turntable, a disc-cartridge tray for receiving and supporting a disc-cartridge, a disc-cartridge pushing plate for fixing the disc-cartridge on the turntable, a disc-cartridge guide plate for loading or ejecting the disc-cartridge gripped in the tray, a driving means for providing power in order to load and eject the disc-cartridge guide plate and pushing the disc-cartridge pushing plate. Such a loading apparatus can improve the stability of inserting, loading, and ejecting operations. Also, this invention has advantages which can automatically use inserting and ejecting operations of the shutter of the disc-cartridge.

9 Claims, 3 Drawing Sheets

5,532,995

DISC-CARTRIDGE FRONT LOADING APPARATUS OF A MINI DISC PLAYER

BACKGROUND OF THE INVENTION

1. Field of the Invention

This invention relates to a disc-cartridge front loading apparatus of a mini-disc player, more particularly the improvement to a disc-cartridge front loading apparatus for a mini-disc player which enables a disc-cartridge inserted from the front to be loaded on a turntable and to be ejected to the position originally inserted.

2. Description of the Prior Art

Generally, a mini-disc player is not constituted with a large structure which is able to be used at a fixed state of a predetermined position such as a compact disc player or a laser disc player and is required with a better stable loading operation of the disc-cartridge because it always uses a changeable position which is not yet fixed such as a portable audio cassette.

The prior art regarding a disc player for a rigid information-carrying disc has been proposed in U.S. Pat. No. 4,498,161 by Kurt Eisemann. The mini-disc player comprises a turntable which is mounted for rotation on a chassis and a lid for closing the player, the lid is pivotally connected to the chassis and carries a disc loader when the lid is pivoted towards the turntable acts resiliently on the turntable.

However, the known player causes an inconvenience in which the lid opens and/or closes when the disc-cartridge is inserted and ejected.

SUMMARY OF THE INVENTION

It is, therefore, an object of the present invention to provide a disc-cartridge front loading apparatus of a mini-disc player for inserting and ejecting the disc-cartridge from the front without opening or closing a lid.

Another object of the invention is to provide a disc-cartridge front loading apparatus of a mini-disc player comprising a turntable; a disc-cartridge tray for receiving and supporting a disc-cartridge; a disc-cartridge pushing plate for fixing the disc-cartridge on the turntable by pushing the disc-cartridge inserted in the disc-cartridge tray, and the pushing plate being mounted on the disc-cartridge tray; a disc-cartridge guide plate for loading or ejecting the disc-cartridge gripped in the disc-cartridge, and the disc-cartridge guide plate being mounted between the disc-cartridge pushing plate and a driving means; and a driving means for providing power in order to load and eject the disc-cartridge from the disc-cartridge guide plate and pushing the disc-cartridge pushing plate.

In order to accomplish the above objects, a disc-cartridge front-loading apparatus in accordance with the present invention is performed so that the disc-cartridge is engaged with a disc-cartridge guide plate when the disc-cartridge is inserted in a disc-cartridge tray from the outside.

At this time, the disc-cartridge is loaded on the turntable when the disc-cartridge guide plate is transferred inside of the disc-cartridge tray by driving of the driving means. Also, when a transferring operation of a gear of the driving means is stopped, the protruded portion is pushed with a disc-cartridge pushing plate so that a gear having a protruded portion is rotated. Accordingly, the disc-cartridge is fixed on the turntable by pushing the disc-cartridge loaded on the turntable.

A gear having a protruded portion is rotated counter-clockwise in case of ejecting the disc-cartridge.

Also, another gear is engaged with a transferring rack of the disc-cartridge guide plate when the disc-cartridge pushing plate is released. Accordingly, the disc-cartridge guide plate is moved counter-clockwise with regard to an insert direction of the disc-cartridge by rotating a gear engaged with the transferring rack, thus ejecting the disc cartridge.

DETAILED DESCRIPTION OF THE PREFERRED EMBODIMENT

Figure 1:
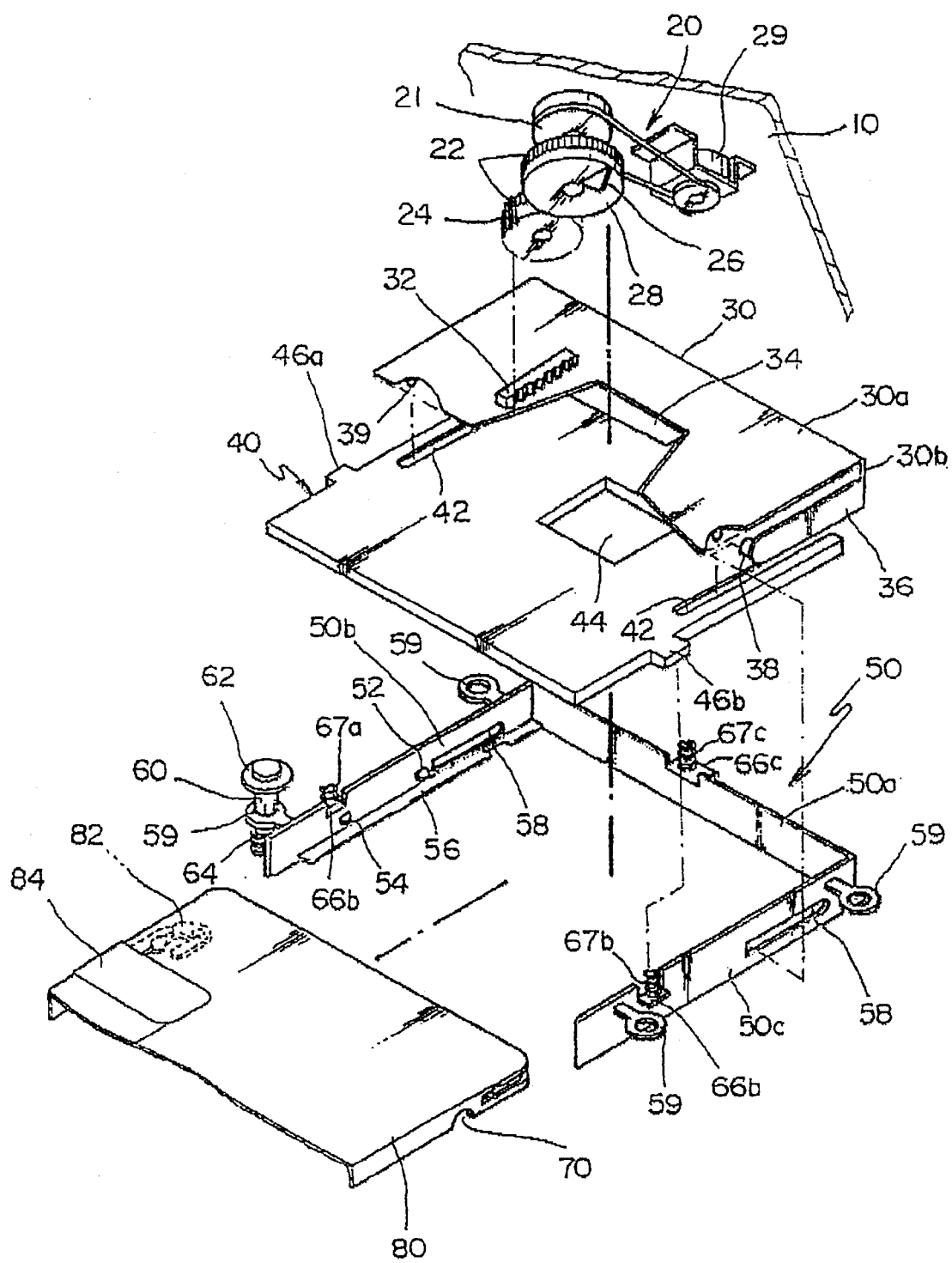
FIG. 1 is an exploded schematic view of a disc-cartridge front loading apparatus of a mini-disc player according to the present invention.

FIG. 1 is an exploded schematic view of a disc-cartridge front loading apparatus of a mini-disc player according to the present invention. As shown in FIG. 1, the disc-cartridge front-loading apparatus comprises a turntable 90; a driving means 20 which includes a driving motor 29 mounted on the inside of a housing 10 in a disc player, a belt pulley 21 connected with driving motor 29 by a belt, a first gear 28 having a protruded portion 26 at the lower part thereof and the first gear 28 being connected and engaged with belt pulley 21, a second gear 24 gearing into the first gear 28; a disc-cartridge guide plate 30 which includes transferring rack 32 gearing into the second gear 24 at the upper part and a cut portion 34 at the middle part, an upper plate 30a formed with a protruded guide 39 at both lower surfaces of the cut portion 34, an engaging piece 36 having a protruded engaging 38 on the inside, and engaging piece 36 being connected parallel to a rear wall 30b curved at a right angle and upper plate 30a located at both ends of the rear wall 30b; a disc-cartridge pushing plate 40 which includes protruded portions 46a, 46b, 46c at both side surfaces and a rear surface thereof and a predetermined distance guide slot 42 at body upper surfaces and a hole 44 at the center thereof; and a disc-cartridge tray 50 which includes a protruded supporting piece 66c for supporting a protruded portion 46c of the disc-cartridge pushing plate 40, a guide hole 58 and a disc-cartridge supporting piece 56 for inserting and engaging a protruded engaging member 38 formed at an engaging piece 36 of the disc-cartridge guide plate 30, two guide rings 59 formed on both side walls 50b, 50c of the disc-cartridge tray 50, a protruded supporting piece 66a, 66b formed on side walls 50b, 50c.

However, a protruded shutter opening member 52 and a shutter fixing piece 54 are formed on one side of the side walls 50b, 50c. Also, a guide ring 59 is inserted with a guide rod 60 fixed on a chassis (the chassis is not shown in the drawing) and is also supported with a coil spring 64 inserted with guide rod 60. A stopper 62 is inserted and fixed on guide rod 60 inserted in guide ring 59. The coil springs 67a, 67b, 67c are inserted in the protruded supporting pieces 66a, 66b, 66c.

The disc-cartridge pushing plate 40 is inserted in the disc-cartridge tray 50 and the protrude portions 46a, 46b, 46c of the pushing plate 40 are inserted in the protruded supporting pieces 66a, 66b, 66c which are provided with coil springs 67a, 67b, 67c of the tray, so that disc-cartridge pushing plate 40 are supported thereto.

Pushing plate 40 is supported in tray 50 when the protruded supporting piece 66a, 66b, 66c which forms the coil spring 67a, 67b, 67c of the tray 50, is supported with the protruded portions 46a, 46b, 46c of the pushing plate 40. Under these states, upper plate 30a of the disc-cartridge guide plate 30 is covered with pushing plate 40 and protruded engaging member 38 of guide plate 30 is engaged with guide hole 58 of tray 50. At this time, hole 44 of pushing plate 40 is located on a cut portion 34 of guide plate 30. Gear 24 of driving means 20 is engaged with transferring rack 32 of guide plate 30 and gear 28 is also located within the cut portion 34 of guide plate 30.

The operation of the disc-cartridge front loading apparatus of the present invention will be described hereinafter.

Figure 2:
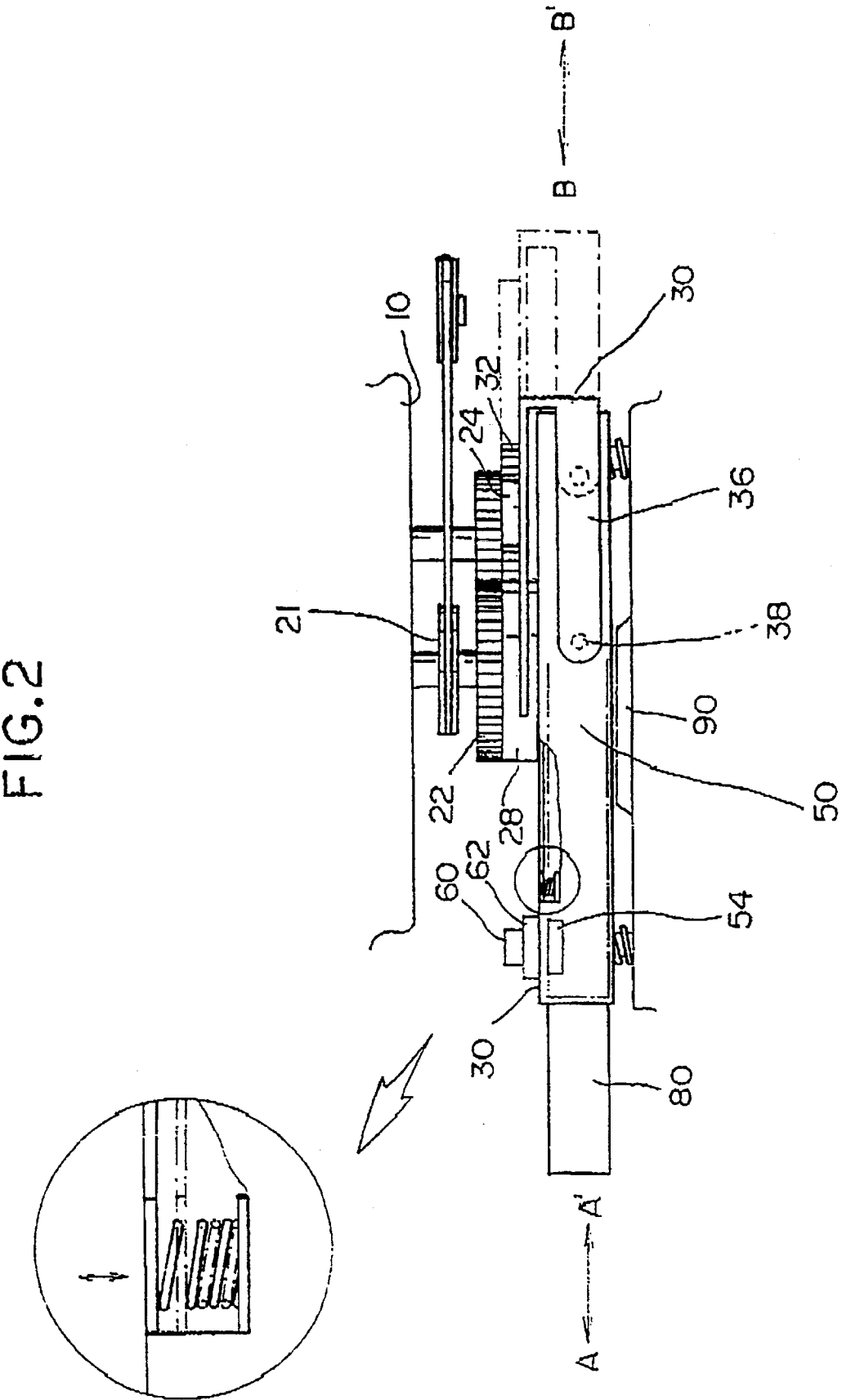
FIGS. 2A and 2B are side views for explaining an insertion, a loading and an ejecting operation of the disc-cartridge of a disc-cartridge front-loading apparatus.
Figure 3A:
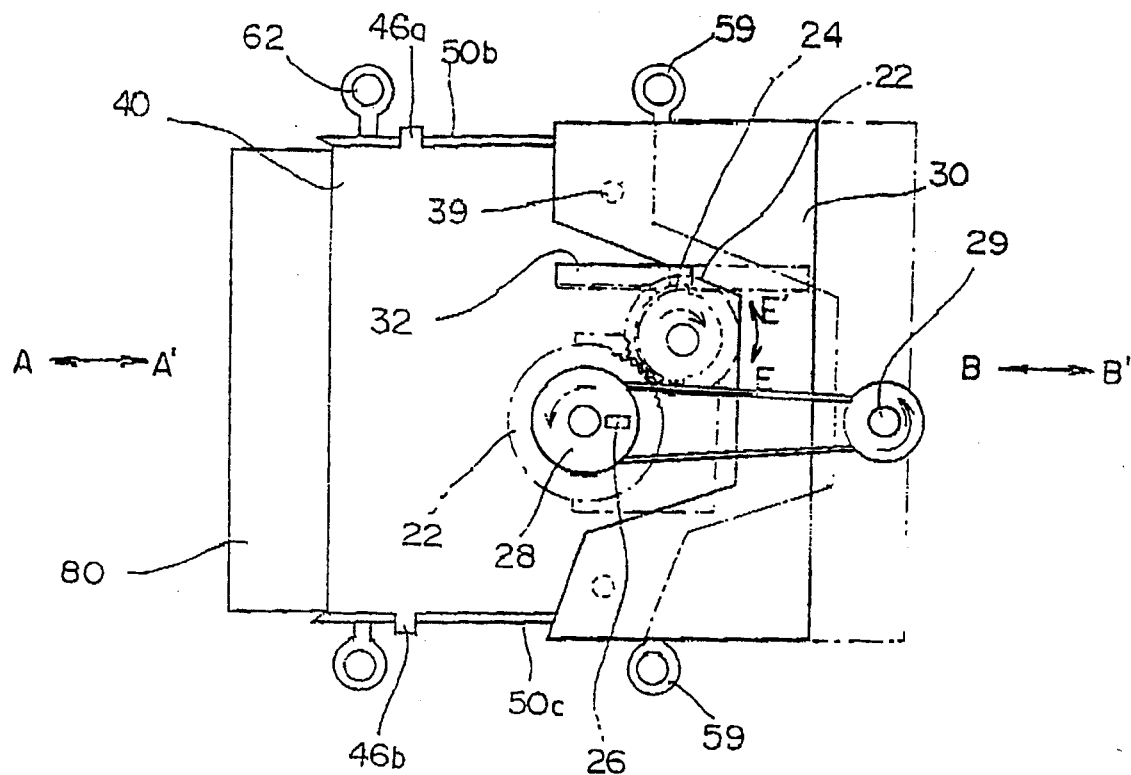
FIG. 3A and 3B are plane views for explaining a gear operating relation in case of loading and ejecting of the disc-cartridge of a disc-cartridge front-loading apparatus.
Figure 3B:
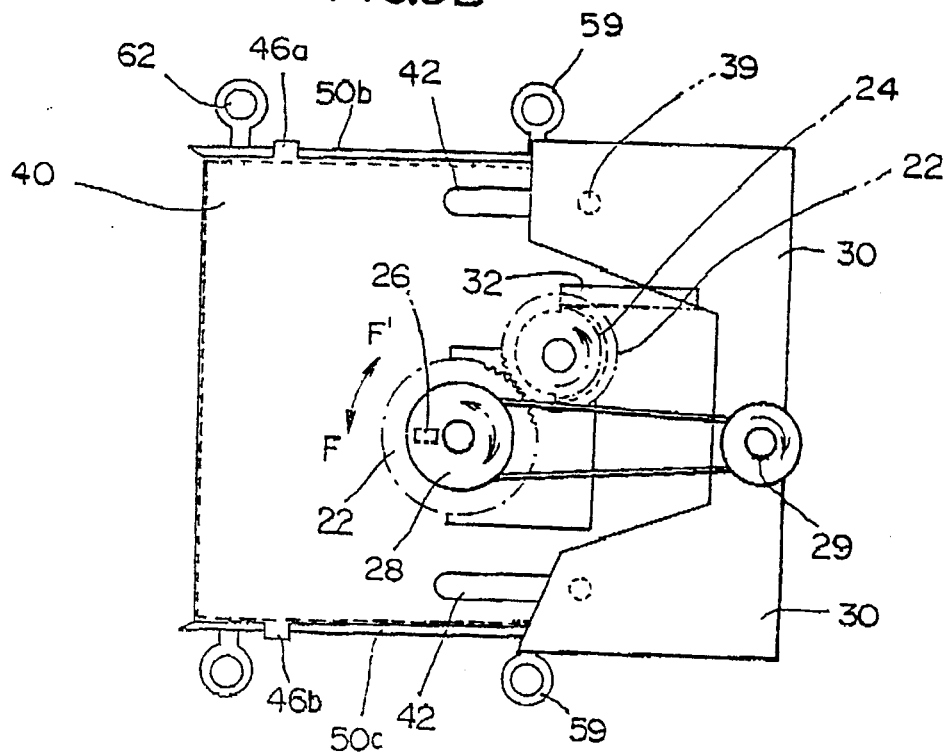

FIGS. 2A and 2B show a primary embodiment of an insertion, a loading and an ejecting operation of the disc-cartridge of the disc-cartridge front-loading apparatus, and FIG. 3A, FIG. 3B show a gear operating relation in loading and ejecting of the disc-cartridge of the disc-cartridge front-loading apparatus.

As shown in FIG. 1 to FIG. 3A, 3B, when disc-cartridge 80 is pushed and inserted in tray 50 of the inside of housing 10 (that is, the direction of arrow A in FIG. 2A), protruded shutter opening member 52 located at side wall 50b of tray 50 is released with locker 82 which holds shutter 84 provided with an inner surface of one side of disc-cartridge 80 so that shutter 84 is opened. The opened shutter 84 is fixed with shutter fixing piece 54. Also, protruded engaging member 38 protruded in an inside of engaging piece 36 on disc-cartridge guide plate 30 is inserted at engaging hole 70 formed at the right and left side of the front end of disc-cartridge 80.

When disc-cartridge 80 is engaged with disc-cartridge guide plate 30, driving motor 29 is rotated and gear 24 which engages with transferring rack 32 mounted on disc-cartridge guide plate 30 is also rotated in the directions indicated by arrow E as shown in FIG. 3A. Also, disc-cartridge 80 is also moved into an inside of housing 10 (that is, the direction indicated by arrow A as shown in FIG. 3A) when disc-cartridge guide plate 30 is moved into an inside of housing 10, the direction indicated by arrow A' as shown in FIG. 3A. Under the completely inserted state of disc-cartridge 80 which is inserted in tray 50, gear 24 of driving means 20 is released with transferring rack 32 on disc-cartridge guide plate 30 and gear 24 is permitted with an idling. The protruded portion 26 (FIG. 3A) of gear 28 is located at the inside of hole 44 of disc-cartridge pushing plate 40. When the gear 28 is partially rotated, the protruded portion 26 bears on the disc-cartridge pushing plate moving it toward the under side (the down-direction indicated by the arrow M as shown in FIG. 2A). At this time, guide ring 59 of tray 50 which is elastically supported by coil spring 64 inserted in guide rod 60 moves downwardly with regard to guide rod 60 so that the disc-cartridge 80 is precisely and stably fixed on turntable 90.

However, in case of ejecting disc-cartridge 80 driving motor 29 is performed with a reverse rotation as shown in FIG. 3A and FIG. 3B. At this time, protruded portion 26 of gear 28 is located at hole 44 (FIG. 3A) of disc-cartridge pushing plate 40 (FIG. 3B), so that the force pushed with disc-cartridge 80 disappears. Also, guide ring 59 is shifted upwardly by a force of restitution of coil spring 64, so that tray 50 is shifted upwardly, the up-direction indicated by the arrow N as shown in FIG. 2A.

When a lifting operation of tray 50 is finished, transferring rack 32 provided with disc-cartridge guide plate 30 is engaged with gear 24 of driving means 20 (E' direction of FIG. 3A). In this case, disc-cartridge guide plate 30 is moved toward the front (B direction of FIG. 2), so that it is ejected from disc-cartridge tray 50 and shutter fixing piece 54 is released and shutter 84 of disc-cartridge 80 is closed again.

As has been described, according to the invention, an insertion, a loading and an ejecting operation of the disc-cartridge is achieved by actions of the disc-cartridge guide plate and the disc-cartridge pushing plate, thus to improve the reliability of the insertion, the loading and the ejecting operations of the disc-cartridge. Also this invention has advantages which can use automatically an inserting and an ejecting operations of the shutter of the disc-cartridge.

What is claimed is:

1. A disc-cartridge front loading apparatus of a mini-disc player comprising:

a turn table;

a disc-cartridge tray for receiving and supporting a disc-cartridge;

a disc-cartridge pushing plate for fixing said disc-cartridge on said turntable by pushing said disc-cartridge inserted in said disc-cartridge tray, said pushing plate being mounted on said disc-cartridge tray, and being formed with protruded portions at both side surfaces and a rear surface thereof and a hole and two predetermined distance guide slots on an upper surface;

a disc-cartridge guide plate for loading or ejecting said disc-cartridge gripped in said disc-cartridge tray, and said disc-cartridge guide plate being mounted between said disc-cartridge pushing plate and a driving means and movable between loading and ejecting positions; and said driving means for providing power in order to load and eject said disc-cartridge to said disc-cartridge guide plate and for pushing said disc-cartridge pushing plate, wherein said driving means comprises:

a driving motor mounted on an inside of a housing in a disc player, said driving motor being driven when said disc-cartridge is engaged with said disc-cartridge guide plate in case of loading said disc-cartridge and being reversely rotated in case of ejecting said disc-cartridge;

a belt pulley connected with said driving motor by a belt;

a first gear having a protruded portion at the lower part thereof and said first gear being connected and engaged with said belt pulley, said hold is located at the center of said disc-cartridge pushing plate, said first gear protruding portion extending into said hold in said disc-cartridge pushing plate when said first gear is in one position and said first gear protruding portion bearing on said disc-cartridge pushing plate when said first gear is in a second position; and a second gear gearing into said first gear, said second gear transferring said disc-cartridge guide plate into an inside and outside of said housing according to the rotation of said driving motor, said second gear being released and engaged with said disc-cartridge guide plate by downward and upward movement of said disc-tray according to the position of said first gear protruding portion.

2. The disc-cartridge front loading apparatus of the mini-disc player according to claim 1, wherein said disc-cartridge pushing plate is formed with a rectangular form.

3. The disc-cartridge front loading apparatus of the mini-disc player according to claim 1, wherein said disc-cartridge tray comprises:

protruded supporting pieces, formed on side walls and a rear wall of said disc-cartridge tray, for supporting a protruded portion of said disc-cartridge pushing plate;

a guide hole and a disc-cartridge supporting piece for inserting and engaging a protruded engaging member formed at an engaging piece of a disc-cartridge guide plate; and two guide rings formed on both side walls of said disc-cartridge tray.

4. The disc-cartridge front-loading apparatus of the mini-disc player according to claim 3, wherein said protruded supporting piece is provided with an elastic member.

5. The disc-cartridge front-loading apparatus of the mini-disc player according to claim 3, wherein said disc-cartridge tray further comprises:

a shutter protruded opening member for opening a shutter of the disc-cartridge, formed on one of the side walls; and a shutter-fixing piece for fixing an opened shutter.

6. The disc-cartridge front-loading apparatus of the mini-disc player according to claim 3, wherein each of said guide rings are inserted with a guide rod fixed on a chassis and is also supported with an elastic member inserted said guide rod.

7. The disc-cartridge front loading apparatus of the mini-disc player according to claim 6, wherein a stopper is mounted on a front end of said guide rod.

8. The disc-cartridge front-loading apparatus of the mini-disc player according to claim 1, wherein said disc-cartridge guide plate includes a transferring rack gearing into the second gear at upper part and a cut portion at the middle part;

an upper plate formed with a protruded guide at both lower surfaces of said cut portion; and an engaging piece having a protruded engaging member on the inside, and said engaging piece being connected parallel to a rear wall curved at a right angle and said upper plate located at both ends of said rear wall.

9. The disc-cartridge front loading apparatus of the mini-disc player according to claim 1, wherein said disc-cartridge tray comprises sidewalls for holding a disc-cartridge, said sidewalls comprising the only means for holding said disc-cartridge.

* * * * *